(No Model.)

T. J. YOST.

APPARATUS FOR THE CONTINUOUS PRODUCTION OF OZONE.

No. 254,424. Patented Feb. 28, 1882.

WITNESSES:
Donn Twitchell
C. Sedgwick

INVENTOR:
T. J. Yost
BY
Munn & Co
ATTORNEYS.

UNITED STATES PATENT OFFICE.

THEODORE J. YOST, OF MAHWAH, NEW JERSEY.

APPARATUS FOR THE CONTINUOUS PRODUCTION OF OZONE.

SPECIFICATION forming part of Letters Patent No. 254,424, dated February 28, 1882.

Application filed December 17, 1881. (No model.)

*To all whom it may concern:*

Be it known that I, THEODORE J. YOST, of Mahwah, in the county of Bergen and State of New Jersey, have invented a new and Improved Apparatus for the Continuous Production of Ozone, of which the following is a full, clear, and exact description.

My invention relates to the production of ozone by electricity, the object being to provide for the continuous generation of pure ozone in sufficient quantity by apparatus acting automatically after once being started.

Reference is to be had to the accompanying drawings, forming part of this specification, in which similar letters of reference indicate corresponding parts in all the figures.

Figure 1:
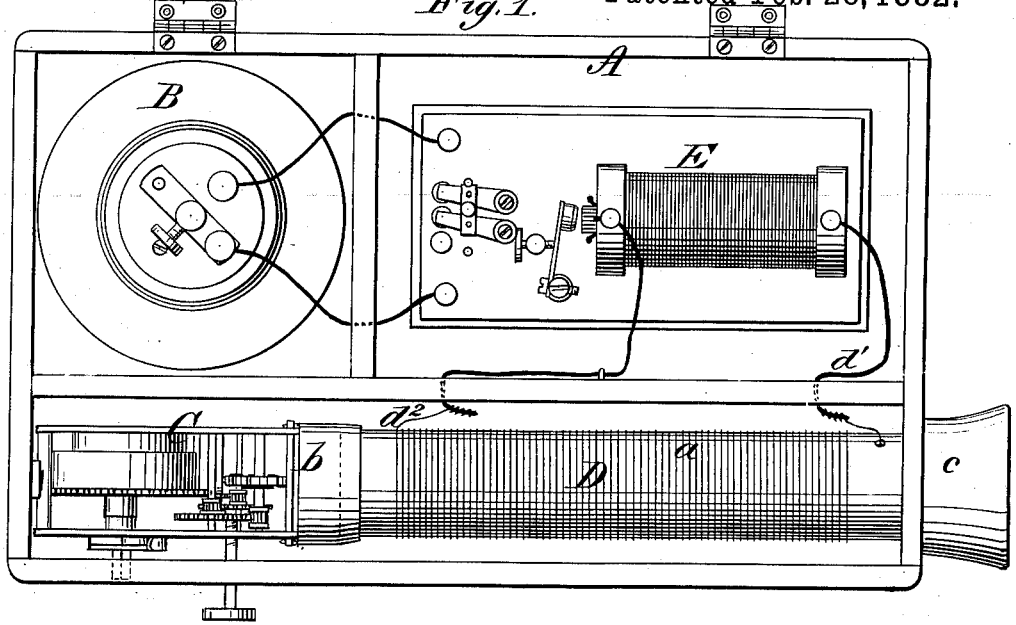
Figure 2:
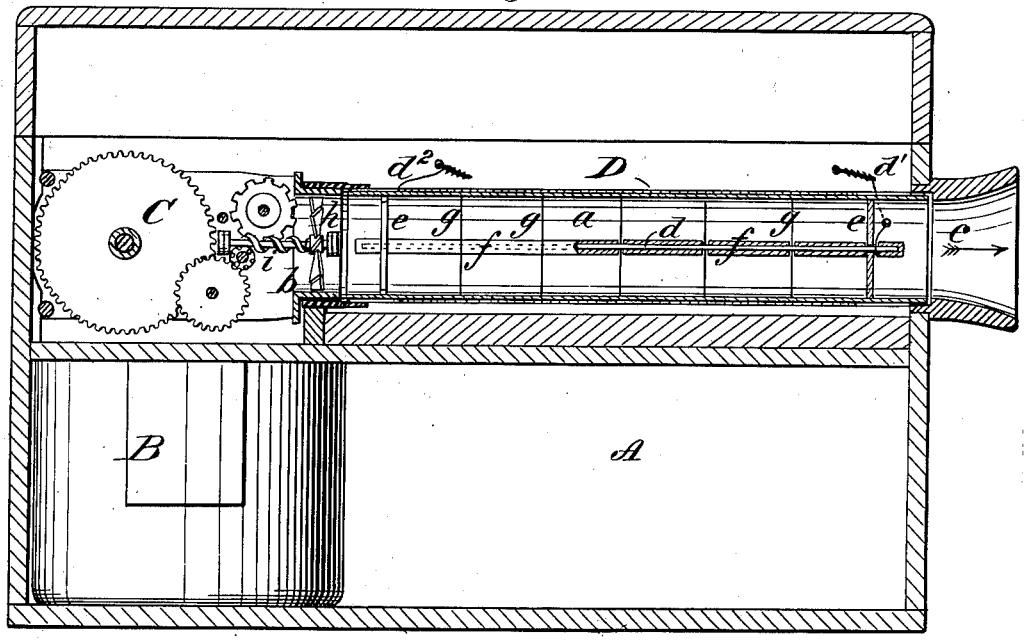
Figure 3:
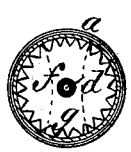

Figure 1 is a plan view of my improved apparatus constructed in a portable form. Fig. 2 is a longitudinal section of the ozonizer, and Fig. 3 is a cross-section of the same.

A is a box or case of convenient size and form for containing the apparatus, and of portable character.

B is a galvanic battery of any suitable construction.

C is the motor, consisting of spring-power clock-work.

E is an induction-coil, and D is the ozonizer proper. The ozonizer D, as shown most clearly in Fig. 2, consists as follows:

$a$ is a glass tube sustained between a short metal tube, $b$, at its inner end, and mouth-piece $c$ at its outer end by insulated supports.

$d$ is a rod or wire sustained centrally of the glass tube by bridges $e$ $e$, and covered by protecting material $f$, put on in sections.

$g$ are disks of metal foil on the wire $d$ in any suitable number, held in place by the sections of protecting material, and having serrated edges, as shown in Fig. 3, that allow passage of air.

$h$ is a rotary fan in tube $b$ on a shaft, $i$, that is connected to the clock-work for being driven thereby. The outer end of wire $d$ connects by wire $d'$ to the induction-coil E, and a wire, $d^2$, from the other end of the coil passes to the inner end of glass tube $a$, around which the wire is wound to near the outer end of the tube. The induction-coil also connects to the battery B.

The operation is as follows: The fan-blower being set in motion, a continuous current of air is forced through the ozonizer D, and during its passage its ozonification is effected by the silent discharge of the electric current through the glass. The operations being automatic and continuous, a constant discharge of ozone takes place from the mouth-piece $c$, and a comparatively small apparatus will answer all ordinary purposes. In case large apparatus is required for purifying the air of large rooms or buildings, steam or other power will be used to drive the fan-blower, and a dynamo-electric machine used in place of the battery. The ozonizer may be applied in connection with and form part of ventilating apparatus. I do not limit myself in those respects. By this apparatus and method ozone in sufficient quantity for practical use is produced at slight expense and without the apparatus requiring constant care and attention.

The ozone is produced pure and naturally—that is to say, by electricity—and its valuable properties as a purifying agent can be utilized to the greatest extent.

Having thus fully described my invention, what I claim as new, and desire to secure by Letters Patent, is—

1. The combination of battery B, motor C, induction-coil E, ozonizer D, and fan $h$, substantially as shown and described, for operation as set forth.

2. The glass tube $a$, provided with wire $d$, disks $g$, and outer winding of wire $d^2$, substantially as shown and described, for use as an ozonizer.

T. J. YOST.

Witnesses:
GEO. D. WALKER,
C. SEDGWICK.